United States Patent
Kersteman

(10) Patent No.: US 8,272,129 B2
(45) Date of Patent: Sep. 25, 2012

(54) AIR CYCLE MACHINE INSERT AND METHOD OF REPAIR

(76) Inventor: David N. Kersteman, Mississauga (CA)

( * ) Notice: Subject to any disclaimer, the term of this patent is extended or adjusted under 35 U.S.C. 154(b) by 1022 days.

(21) Appl. No.: 12/232,375

(22) Filed: Sep. 16, 2008

(65) Prior Publication Data

US 2010/0064514 A1    Mar. 18, 2010

(51) Int. Cl.
B21K 25/00    (2006.01)

(52) U.S. Cl. ........ 29/889.2; 29/889; 29/889.3; 29/889.4

(58) Field of Classification Search .................... 29/888, 29/889, 889.2, 889.3, 889.4, 889.5, 890.01; 60/39.5, 804, 736, 745, 226.1, 792, 752, 60/740; 244/53 R, 23 D; 415/115, 176, 415/178, 1, 104, 107, 205; 604/288.01, 288.02, 604/288.04
See application file for complete search history.

(56) References Cited

U.S. PATENT DOCUMENTS

| | | | |
|---|---|---|---|
| 2,252,986 A | 8/1941 | Scott | |
| 4,547,941 A | 10/1985 | Meier | |
| 5,222,295 A | 6/1993 | Dorris, Jr. | |
| 5,295,300 A | 3/1994 | Garrick, Jr. | |
| 5,928,448 A | 7/1999 | Daws | |
| 6,102,329 A * | 8/2000 | Guinan et al. | 244/53 R |
| 7,325,403 B2 | 2/2008 | Currin et al. | |
| 7,367,122 B2 | 5/2008 | Yip et al. | |
| 2006/0080832 A1 | 4/2006 | Yip et al. | |

FOREIGN PATENT DOCUMENTS

DE    3921423    1/1990

OTHER PUBLICATIONS

Website, http://www.mrs.org/s_mrs/sec_subscribe.asp?CID=2632&DID=116819&action=detail, "An Intermediate TCE Nanocomposite Coating for Thermal Barrier Coatings," abstract from the Materials Research Society, printed from the Internet on Jun. 5, 2008.

Website, http://www.springerlink.com/content/17h47196556287m1/, "Assessment of damage accumulation in thermal barrier coatings using a fluorescent dye infiltration technique," abstract published by Springer Boston, printed from the Internet on Jun. 5, 2008.

* cited by examiner

Primary Examiner — Richard Chang
(74) Attorney, Agent, or Firm — Richard C. Litman

(57) ABSTRACT

The air cycle machine insert and method of repair provides an economical repair of the turbine housing section of an air cycle machine, rather than scrapping the component and replacing with a new section. The toroid shaped insert or liner has a U-shaped cross section, configured to fit closely within the turbine air passage of the air cycle machine. A throat insert is also provided. The existing throat flange extending outwardly over the turbine air passage is removed for installation of the insert. High temperature silicone sealant is preferably placed between the wall of the turbine air passage and the liner, after machining the air passage wall to remove irregularities. The liner is then installed and mechanically secured with one or more rivets, the throat insert is installed to replace the previously removed throat flange, and the repaired turbine housing reassembled with the air cycle machine to complete the repair.

6 Claims, 4 Drawing Sheets

AIR CYCLE MACHINE INSERT AND METHOD OF REPAIR

BACKGROUND OF THE INVENTION

1. Field of the Invention

The present invention relates to air cycle machines, as used in high performance pressurized aircraft for control of the interior environment of the aircraft. More specifically, the present invention comprises a specially formed insert or liner for installation in the turbine section of the air cycle machine, and a method of modifying the turbine section for installation of the insert and installing the liner or insert.

2. Description of the Related Art

Air cycle machines are installed in high performance pressurized aircraft to condition the cabin air and control the environment (i.e., temperature and humidity) within the passenger cabin and crew compartment of the aircraft. The housing sections of these machines are formed of magnesium, used primarily due to its strength to weight ratio and other beneficial properties. However, the magnesium castings are prone to cracking, particularly in the turbine section of the machine due to the temperature differential across the wall of the turbine air passage.

Even though the air has passed through a heat exchanger prior to entering the turbine section, the air remains at a relatively high temperature in the turbine before exiting the turbine through a series of expansion nozzles where the air expands and cools. The cooled and expanded air enters an expansion chamber directly behind the turbine air passage, with the relative temperature differences on each side of the wall between the expansion chamber and the turbine air passage resulting in considerable thermal stress on the wall. This leads to cracks forming in the turbine air passage wall over a period of time and operational heat cycles of the air cycle machine. The interior surface of the air passage wall is also eroded over time due to fine particulates carried in the air as it passes through the machine, particularly during ground operation.

Heretofore, the means of repairing such a damaged air cycle machine was to replace the damaged component, i.e., the turbine housing. Obviously this is a costly operation, as the housing is a complex cast and machined component. The labor involved is considerable as well, as the turbine housing is sandwiched between the compressor housing and the fan containment housing and the rotor shaft passes through the various housings as well. Thus, essentially the entire air cycle machine must be disassembled in order to remove the defective turbine housing, and reassembled with a new or reconditioned turbine housing.

Various devices and methods have been developed in the past for repairing and/or insulating components affected by heat within turbines and other compression machines. For example, German Patent Publication No. 3,921,423 published on Jan. 4, 1990 describes (according to the drawings and English abstract) a method for reducing weld defects in the welding of a compression unit to a housing, comprising a double weld in which the second weld corrects any defects from the first weld.

None of the above inventions and patents, taken either singly or in combination, is seen to describe the instant invention as claimed. Thus, an air cycle machine repair insert and method of repair solving the aforementioned problems is desired.

SUMMARY OF THE INVENTION

The air cycle machine insert and method of repair provides a considerably more economical alternative for repairing an air cycle machine having a damaged turbine air flow passage, than the conventional repair technique of replacing the entire damaged housing section. The present insert and method of repair comprises a toroidal liner or insert having a generally U-shaped cross section through its circumferential ring to conform to the interior channel of the turbine air flow passage of an air cycle machine. The liner is preferably formed of corrosion resistant steel (i.e., stainless steel) to reduce deterioration and to resist wear due to the toughness of such steel.

The existing inner flange extending outwardly over the inner portion of the turbine air flow passage is removed to provide clearance for insert or liner installation. The interior surface of the air flow passage is then smoothed and machined as required to remove irregularities, and coated with an appropriate sealant. The air flow passage liner is then installed within the turbine air flow passage, and secured mechanically in place by one or more rivets (preferably three such rivets) through the walls of the insert and underlying turbine air flow passage. A toroidal throat insert having a cylindrical portion with a flange extending from one edge or end thereof is then installed over the air passage insert, to take the place of the previously removed flange. The throat insert is press fit into place and a locking pin installed through the throat insert wall and into the underlying wall of the turbine air flow passage, and the repaired turbine housing is reassembled with the air cycle machine to complete the repair.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
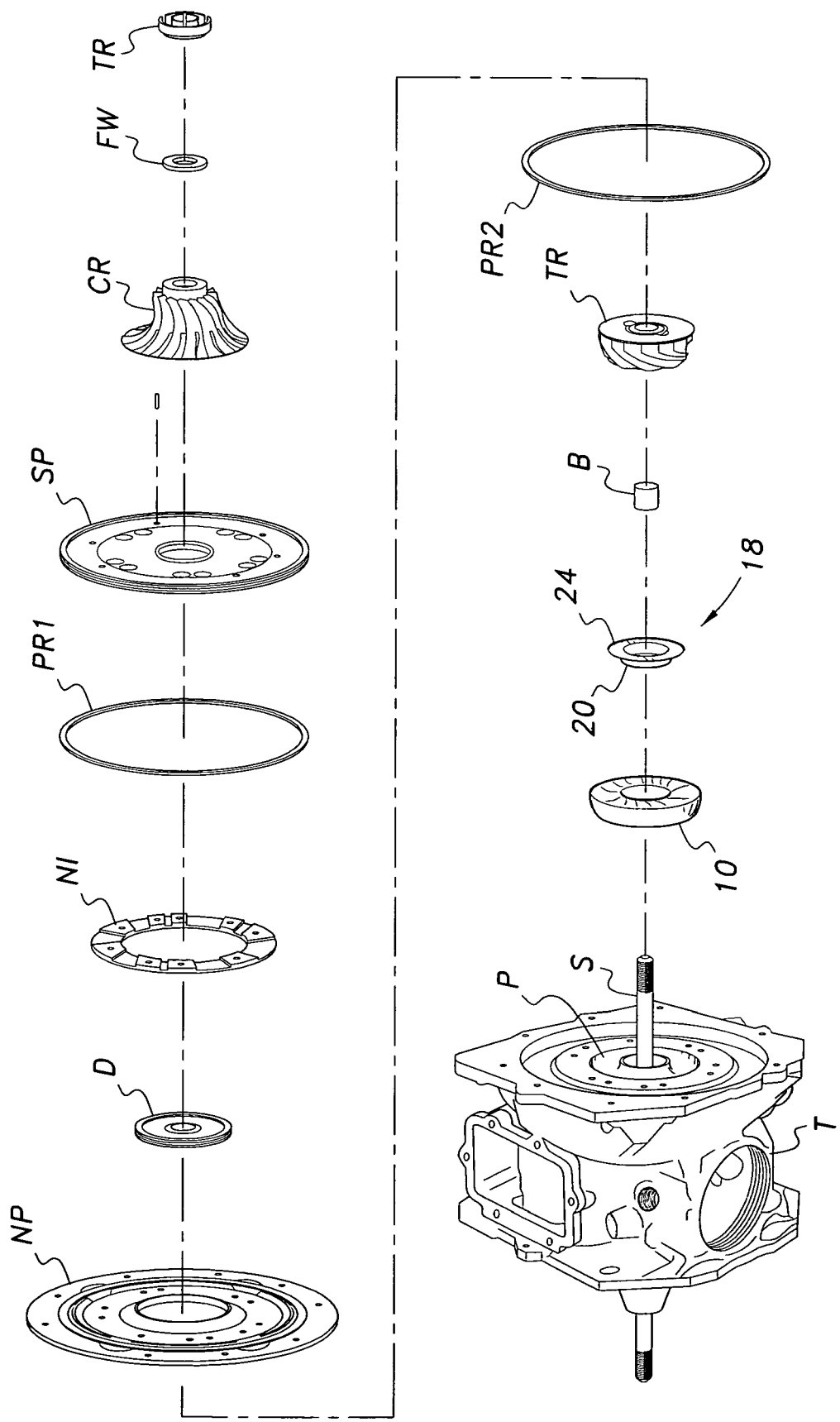
FIG. 1 is an exploded perspective view of the turbine section of an air cycle machine and turbine air flow passage liner according to the present invention, showing their respective positions upon installation.
Figure 2:
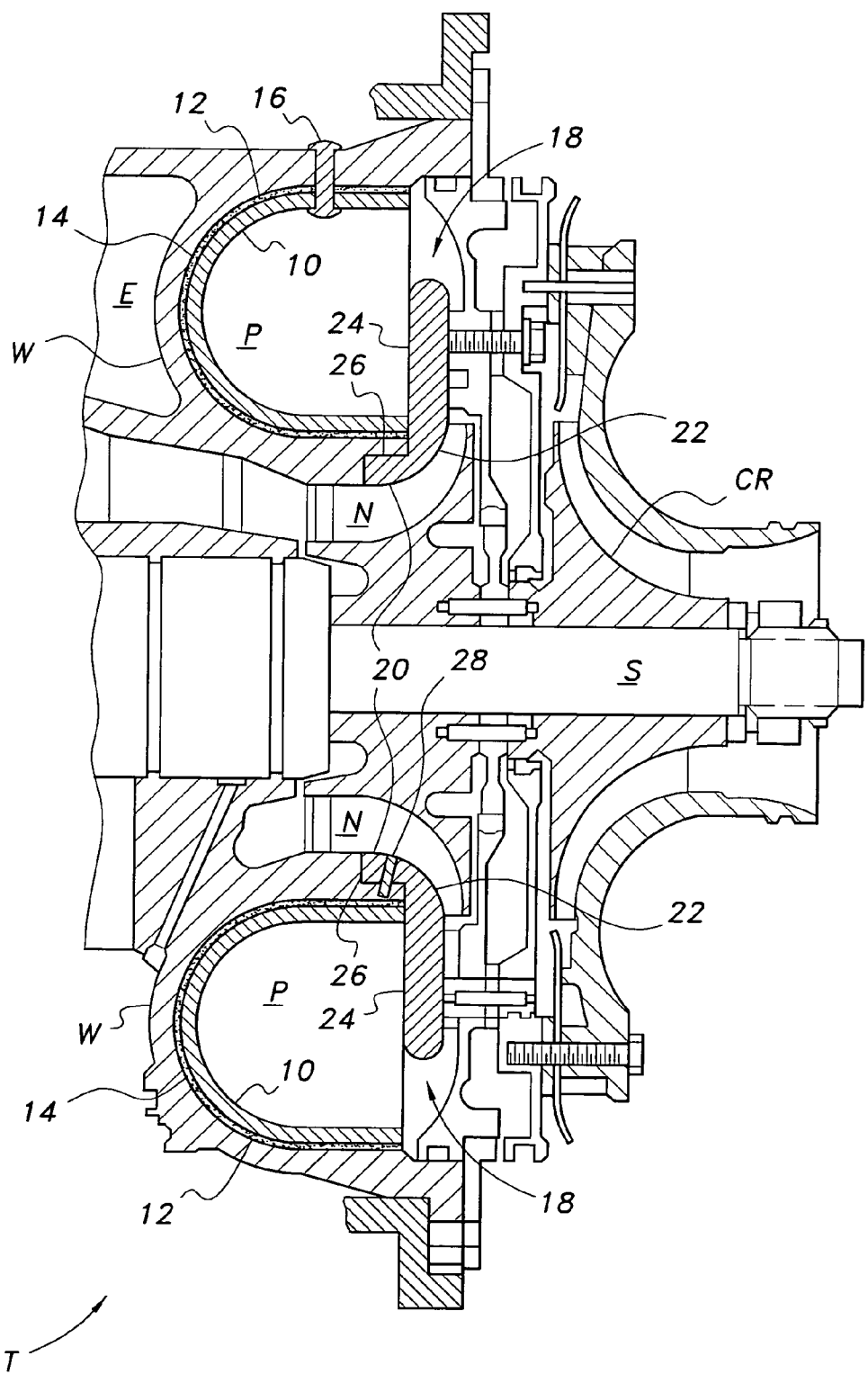
FIG. 2 is a broken away detailed side elevation view in section of the forward end of the turbine section of the air cycle machine after installation of the present insert or liner, showing details thereof.
Figure 3:
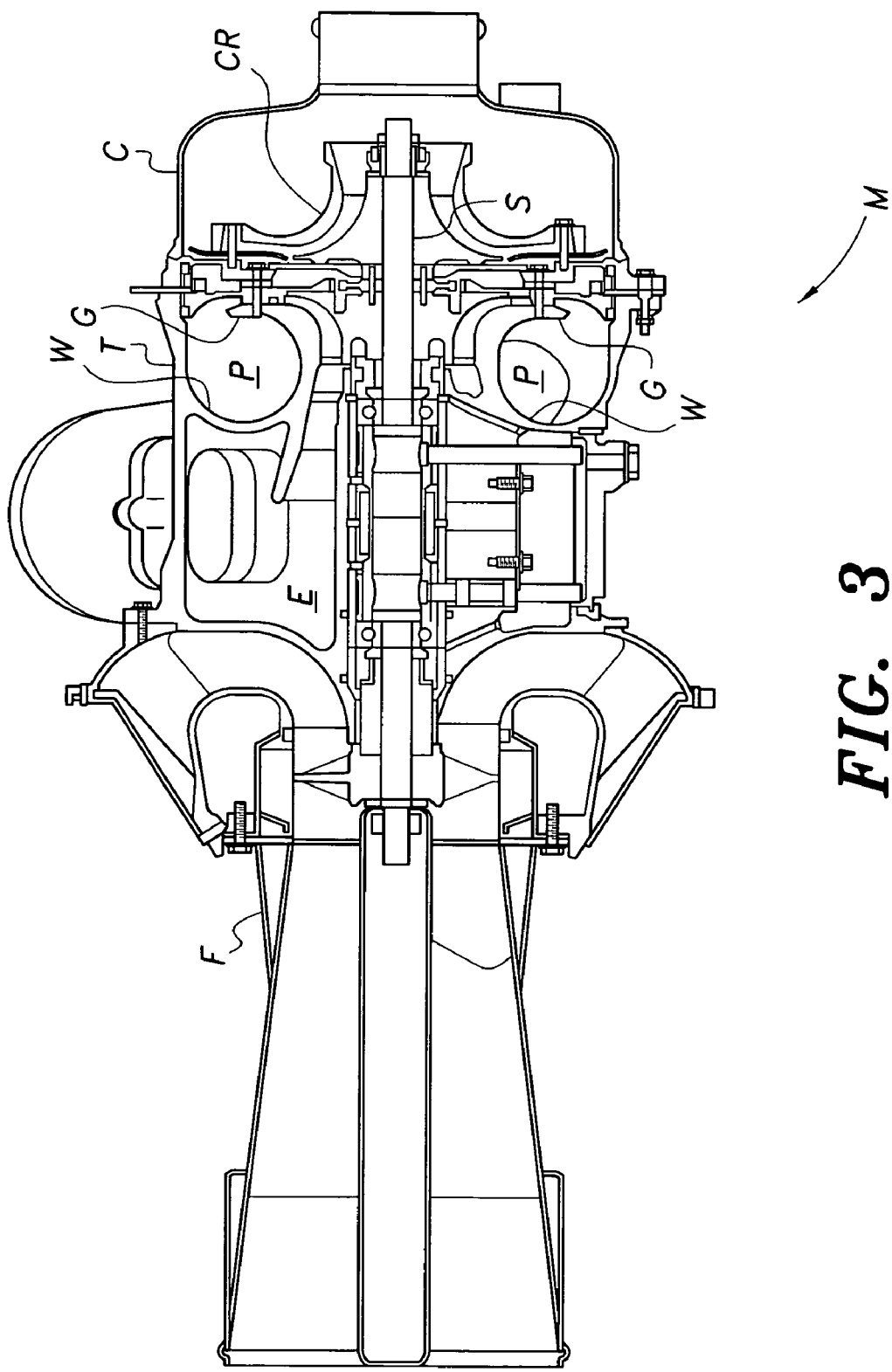
FIG. 3 is a prior art side elevation view in section of an exemplary unmodified air cycle machine showing details thereof, including the turbine section of the machine.

The present invention is an insert for the repair of an air cycle machine as used for conditioning the cabin air of a turbine powered aircraft, and a method of repairing such an air cycle machine using the present insert. Prior art FIGS. 3 and 4 respectively illustrate side elevation views in section of an exemplary air cycle machine M and the turbine section T of such a machine. Air cycle machines M essentially include three subassemblies comprising a compressor section C, a turbine section T, and a cooling fan section F. The turbine section T as shown in FIGS. 1 and 2 and in prior art FIG. 4 includes a turbine air passage P therein, with an expansion chamber E separated from the air passage P by the turbine scroll wall W therebetween.

The relatively high pressure heated air passes from the turbine air passage P to the expansion chamber E through a series of expansion nozzles N, where the air loses considerable energy in the form of pressure and temperature reductions. Thus, the air in the expansion chamber E is considerably cooler than that within the turbine air passage P, with the air at different temperatures separated only by the turbine air passage scroll wall W. The resulting thermal stress across the turbine air passage scroll wall W results in myriad fine cracks developing in the wall W, thereby rendering the air cycle machine M, unairworthy.

Prior to the development of the present invention, the accepted solution for repairing the damaged turbine section T of an air cycle machine M was to disassemble the machine in order to remove the damaged turbine section, and replace the casing or housing of the turbine section with a new or reconditioned casing or housing. Clearly, this is a relatively costly process. Accordingly, the present invention provides an air cycle machine repair insert or liner 10 for installation within the turbine passage P of the machine. The insert 10 comprises a turbine air passage liner having a toroid shape or configuration, with the circumferential ring element of the insert or liner 10 having a generally U-shaped cross section closely conforming to the internal shape of the turbine air passage P as defined by the turbine section wall W. The insert or liner 10 is preferably formed of corrosion resistant steel, i.e., stainless steel, in order to resist corrosive influences accelerated by the relatively high temperatures to which the insert 10 is exposed in an operating air cycle machine. The insert or liner 10 is preferably stamped or otherwise formed of a relatively thin sheet of metal; the thickness shown in cross section in FIG. 2 is exaggerated for clarity in the drawing.

The repair process is accomplished by initially removing the turbine section T of the air cycle machine M from the remainder of the machine. Conventional componentry, e.g., the self-locking threaded ring R and flat washer FW securing the compressor rotor CR to the shaft S, the seal plate SP and packing ring PR1, nozzle insulator NI, seal disc D, nozzle plate and insulator NP and packing ring PR2, turbine rotor TR, and sleeve bushing B, is removed from the front of the turbine housing T and shaft S to access the front of the turbine air passage P, generally as shown in the exploded perspective view of FIG. 1.

Figure 4:
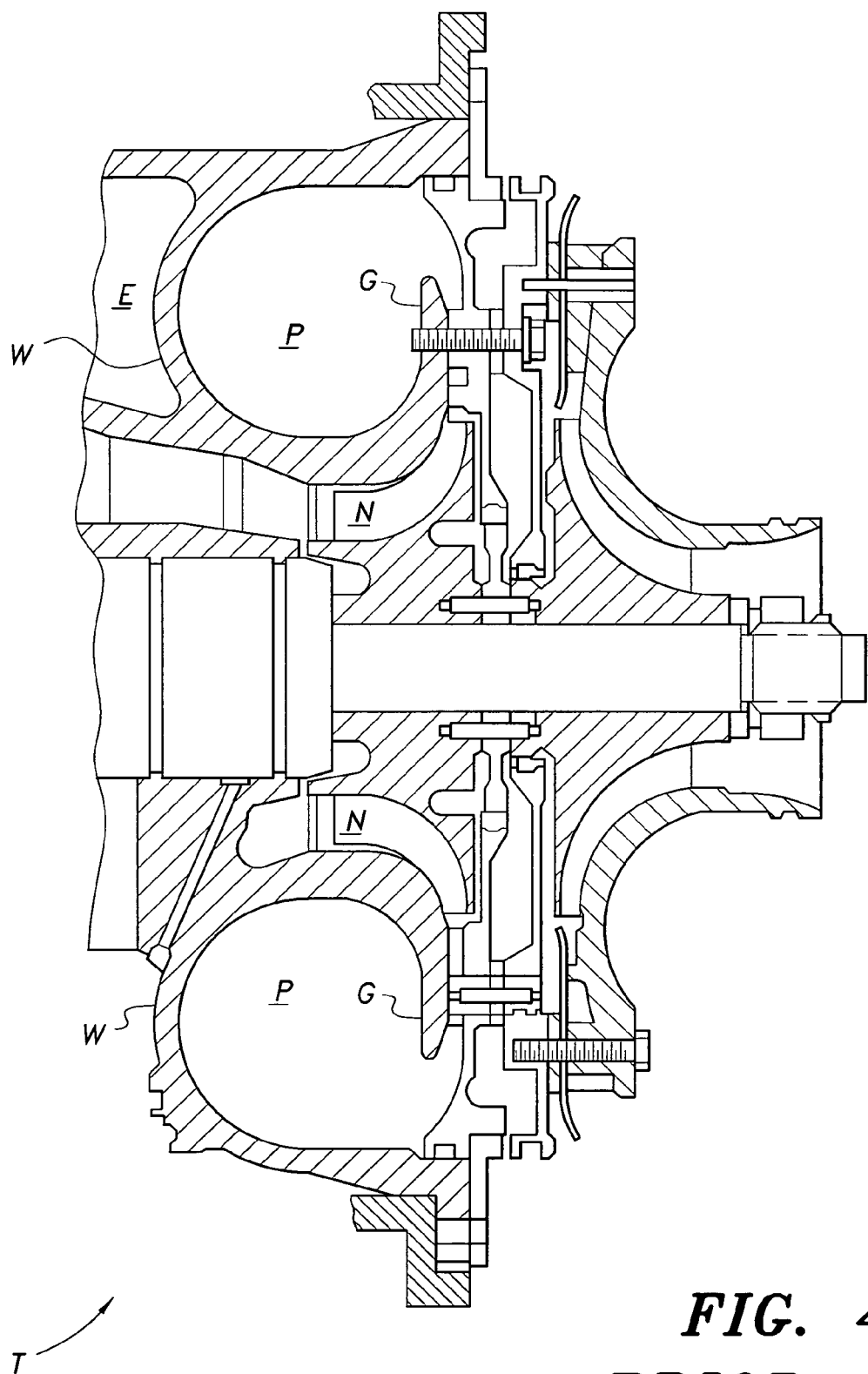
FIG. 4 is a prior art broken away detailed side elevation view in section of the forward end of the turbine section of the unmodified air cycle machine, showing details thereof.

The conventional turbine section T of an air cycle machine M includes an outwardly disposed guide G or throat between the turbine air passage P and the air passage outlet nozzle N, as shown in prior art FIG. 4 of the drawings. This throat or air flow guide G must be removed in order to permit the insert or liner 10 to be installed within the turbine air passage P. The turbine housing T of FIG. 1 shows such a modification, with the throat or guide G having been removed (e.g., machined away, etc.) in order to provide access to the entire radial width of the turbine air passage P for installation of the insert or liner 10. The throat or guide has also been removed in the detailed side elevation view in section of FIG. 2, showing the repaired turbine section T. It will be seen that this throat or guide removal step further includes the cutting of an inwardly facing notch or step in the structure for the installation of a throat insert, discussed further below.

When the throat or air flow guide G has been machined away or otherwise removed to provide access to the entire width of the air flow passage P, the new insert or liner 10 may be installed therein. Preferably, the interior surface of the turbine air flow passage P is treated by lightly machining away any irregularities thereon, i.e., "cleaning up" the surface to provide good contact with the insert or liner 10, prior to installing the liner. Also, a coating 12 of high temperature silicone sealant or suitable equivalent is preferably applied to the interior surface of the turbine air flow passage wall W or to the contact surface 14 of the insert or liner 10 prior to installing the liner or insert 10. This silicone sealant coating 12 is shown in the completed liner or insert installation shown in section in FIG. 2 of the drawings. Positive attachment of the liner or insert 10 within the turbine air flow passage P is provided by installing at least one rivet 16 (and preferably three such rivets) through the liner 10 and into the turbine passage wall W, as shown in FIG. 2.

At this point, some replacement for the throat or air passage guide G must be installed, to return the air passage P to a cross section reasonably close to its original configuration. This is accomplished by installing a throat insert component 18 to replace the previously machined away throat or guide G. The throat insert 18 includes a relatively short cylindrical portion 20 that forms a press fit in the notch or step previously machined in the inwardly facing rim of the turbine air passage wall W. The cylinder 20 has a first end 22, i.e., the end oriented toward the compressor rotor CR, with a turbine air passage flange 24 extending outwardly therefrom. The opposite second end 26 of the cylindrical portion 20 is oriented toward the turbine rotor TR, and fits tightly into the bottom of the previously machined step or notch.

A small hole is drilled through the cylindrical portion 20 of the throat insert 18 and the stepped inner portion of the turbine air passage wall, and a locking pin 28 is installed therein to preclude movement of the throat insert 18 relative to the turbine section T. It has been found that only a single such pin 28 is required due to the press fit of the cylindrical portion 20 of the insert within the stepped portion of the air flow passage wall and the installation of additional componentry thereon when the air cycle machine has been reassembled. However, multiple pins 28 may be installed if so desired. At this point, the various componentry previously removed from the turbine section T is reinstalled, and the reassembled turbine section is installed with the previously removed cooling fan F and compressor C sections to complete the process.

In conclusion, the air cycle machine insert and method of repair of an air cycle machine using the insert provides a tremendous saving in the cost of repair of the turbine section of such machines. The insert or liner permits the existing turbine section to be reused, and provides a number of benefits that do not exist with an unmodified turbine section, even if new. The use of the stainless steel insert or liner within the turbine air flow passage provides a harder surface, more resistant to erosion than the magnesium material from which the turbine section is made. The smoother surface of the stainless steel liner also increases the efficiency of the machine by reducing boundary layer turbulence and drag induced in the airflow by the relatively rough or cracked surface of the unmodified turbine air flow passage. The liner or insert, in combination with the high temperature silicone sealant used between the surface of the turbine air flow passage and the stainless steel liner, results in somewhat greater thermal insulation between the turbine air flow passage and the adjacent expansion chamber and precludes any crossflow between the turbine air flow passage and the expansion chamber due to minute cracks in the air flow passage wall. Accordingly, the repair insert and method of repair for air cycle machines provides significant advantages over the conventional method of repair by replacing the entire turbine section of the machine.

It is to be understood that the present invention is not limited to the embodiment described above, but encompasses any and all embodiments within the scope of the following claims.

I claim:

1. In an air cycle machine having a turbine section with a turbine air passage therein, an air cycle machine repair insert comprising a turbine air passage liner having a toroid configuration with a U-shaped cross section across a circumferential ring element defining the toroid configuration; a turbine air passage throat insert having a cylindrical portion with a first end and a second end opposite the first end; a locking pin disposed through the cylindrical portion of the throat insert; and at least one rivet disposed through the turbine air flow passage liner.

2. The air cycle machine repair insert according to claim 1, further comprising a turbine air passage flange extending outwardly from the first end thereof.

3. The air cycle machine repair insert according to claim 1, further comprising the turbine air passage liner having an air passage contact surface with a high temperature sealant disposed thereover.

4. An air cycle machine and repair insert therefor, comprising in combination:
   a compressor section;
   a turbine section containing a turbine air flow passage therein;
   a cooling fan section, the turbine section disposed coaxially between the compressor section and the cooling fan section; and
   a turbine air passage liner having a toroid configuration with a U-shaped cross section across the circumferential ring element defining the toroid, disposed within the turbine air flow passage of the turbine section;
   a turbine air passage throat insert having a cylindrical configuration with a first end and a second end opposite the first end;
   a locking pin disposed through the cylindrical portion of the throat insert and into the wall of the turbine air flow passage; and
   at least one rivet disposed through the turbine air flow passage liner and into the wall of the turbine air flow passage.

5. The air cycle machine and repair insert combination according to claim 4, further comprising a turbine air passage flange extending outwardly from the first end thereof, disposed within the turbine air flow passage of the turbine section between the turbine air passage liner and the compressor section.

6. The air cycle machine and repair insert combination according to claim 4, further comprising a coating of high temperature sealant disposed between the turbine air passage liner and the turbine air passage.

* * * * *